Aug. 16, 1955 F. T. ANDREWS, JR 2,715,656
ELECTRICAL INFORMATION SYSTEM
Filed Aug. 2, 1952
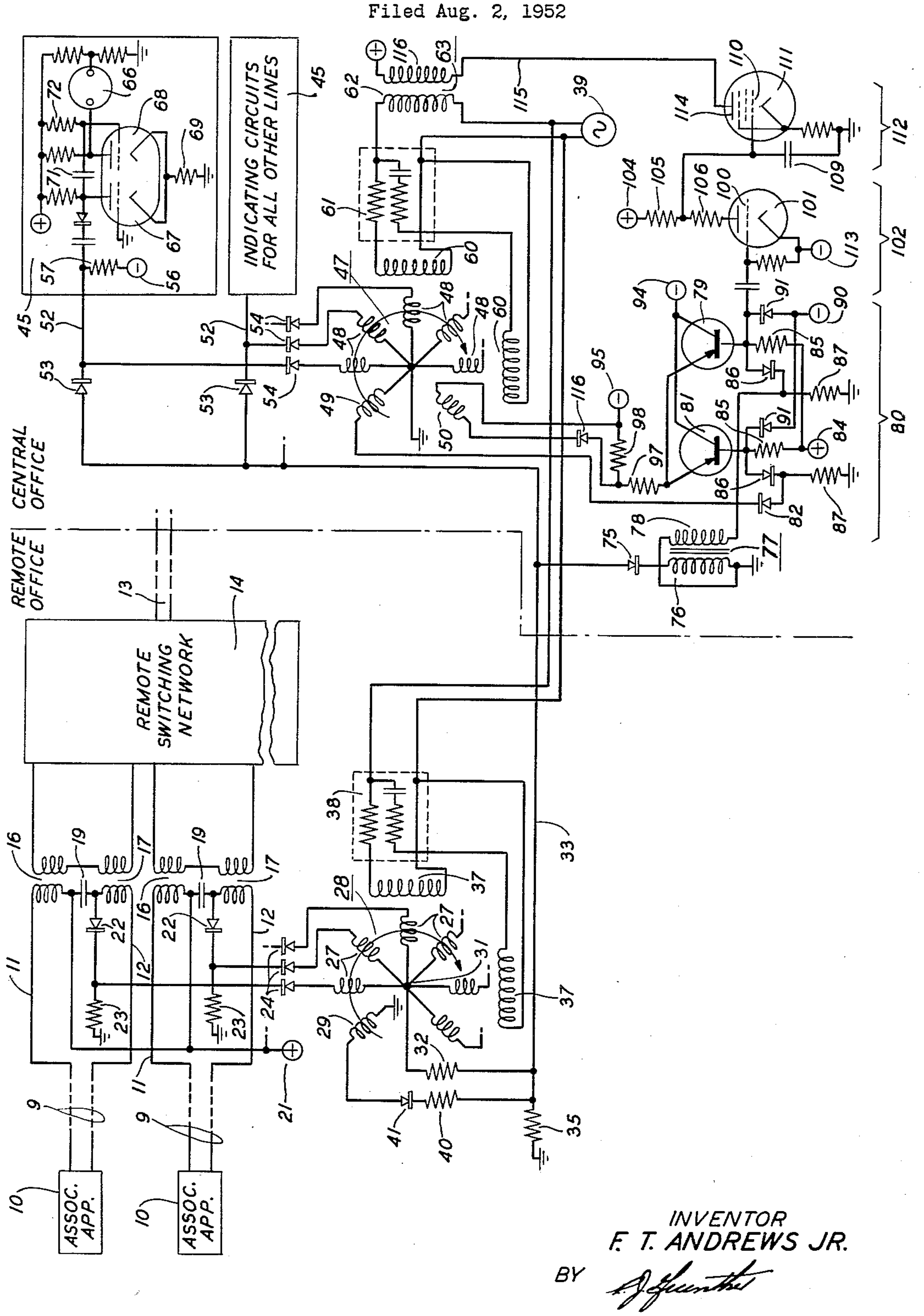
INVENTOR
F. T. ANDREWS JR.
BY
ATTORNEY United States Patent Office 2,715,656
Patented Aug. 16, 1955

2,715,656

ELECTRICAL INFORMATION SYSTEM

Frederick T. Andrews, Jr., Morristown, N. J., assignor to Bell Telephone Laboratories, Incorporated, New York, N. Y., a corporation of New York Application August 2, 1952, Serial No. 302,445
14 Claims. (Cl. 179—18)

This invention relates to electrical systems for transmitting to a central station or office from a remote station or office information concerning the condition of any of a plurality of lines in the remote station and for receiving the information in the central station and identifying the particular line in the remote station to which the information is pertinent.

In various types of electrical networks or systems, it is desirable to be able to determine at one point the condition of lines or terminals at another point, which lines or terminals may be electrically unconnected to any apparatus at the one point and which may be physically quite remote therefrom. The lines may be considered as being in or emanating from a remote station while the apparatus which takes some action on or some cognizance of the condition of the lines dependent on the information received may be considered as being in a central station to which information from a number of remote stations may be sent. Various systems where these situations arise include telephone, telegraph, teletypewriter, computer and similar information dependent systems. Thus in a telephone system wherein the individual subscriber lines are connected to satellite stations which in turn are connected to a common central office by a number of trunks, it is desirable for the central office to know at any time the condition of the individual subscriber lines emanating from the satellite office. Such a telephone system is described in the application Serial No. 302,371, filed August 2, 1952, of K. S. Dunlap and C. A. Lovell.

One general object of this invention is to facilitate the determination at one station in a system, of the condition of any of a multiplicity of lines at a second station remote from the first.

More specifically it is one object of this invention to provide an improved means for scanning a number of lines or terminals and transmitting a train of pulses representing the information as to the condition of each line scanned, each line being assigned a time slot in the cycle of pulses so that the condition of that time slot is representative of the condition of the line assigned thereto.

It is a further object of this invention to provide means for gating the train of pulses into indicating circuits in the central station such that each indicating circuit is assigned to a particular time slot in the train of pulses and thus to a particular one of the lines being scanned.

A still further object of this invention is the provision of means for assuring synchronism of the scanning operation in the remote station and the gating operation in the central station so that an indicating circuit will be responsive only to the pulse condition of the time slot assigned thereto and will not be receptive to false information received from the neighboring time slots in the pulse train.

These and other objects of this invention are attained in one specific illustrative embodiment of this invention by the provision of means for generating a series of pulses to be applied in succession to a scanning resistor associated with each of the lines being scanned and connected to one wire or terminal of the line. A source of direct voltage is connected to the other wire or terminal of the line being scanned and means are provided for isolating the two wires of the line with respect to direct current. The two wires of each line thus define a loop of a circuit having a scanning resistor connected to ground at its one end and a voltage applied at its other end, the circuit being open when the apparatus associated with the line is not connected thereto and closed when the apparatus is connected across the two wires of the line. Thus when the line is not being utilized by the apparatus, this circuit is open and no current, other than what might be due to leakage conditions, flows through the scanning resistor and the voltage across the resistor is substantially zero. A pulse is supplied by the scanning means to the scanning resistor and, when there is no voltage across the scanning resistor, this pulse will cause current to flow in a scanning circuit comprising the scanning pulse generator means, the scanning resistor, and an output resistor which is common to all the lines being scanned. As current flows in this scanning circuit, there is a resultant voltage pulse or information pulse across the common output resistor which will occur in the time slot of that particular line and which indicates that the line is idle, that is, is not being utilized for passage of current to or from the associated apparatus.

When the associated apparatus is connected to the line, however, the circuit including the two wires, voltage source, and scanning resistor is closed and current flows in the scanning resistor producing a finite voltage across it. This voltage is, in accordance with one aspect of this invention, sufficiently large to prevent the flow of current from the scanning generator through the scanning circuit and thus no current will flow through the common output resistor. The result is that no voltage is developed across the common output resistor during the time slot of that line and the absence of this pulse in the pulse train indicates that the line assigned to that time slot is being utilized by the associated apparatus.

A synchronizing pulse is also generated by the scanning generator once each cycle and is applied to the common output resistor in such a way as to generate a pulse of reverse or opposite polarity in the pulse train. In this way, a pulse train is sent to the central station from the remote station, the pulse train comprising an information pulse or the absence of a pulse in the time slot assigned each line and one synchronizing pulse of opposite polarity every cycle. In accordance with a feature of this invention, means are provided at the central station for separating the information contained in this time division basis to actuate individual indicating means assigned to each time slot. This function is performed in accordance with a feature of this invention by a gating circuit which steps in exact synchronism with the remoted scanner.

In one specific embodiment of this invention, the gating circuit comprises a gating pulse generator driven in synchronism with the scanning pulse generator in the remote station. The pulse train is transmitted from the remote station on a common output lead which is terminated in a plurality of leads, one for each line. To each of these leads one coil of the gating pulse generator is connected to form therewith an AND circuit which allows passage of the pulse from the common output lead to the individual indicating means assigned to that line only when both a gating pulse and an information pulse appear in the time slot of that particular line.

In accordance with a feature of this invention, means are provided for assuring that the gating and scanning generators remain in exact synchronism. At the central station the scanner synchronizing pulse is separated from the pulse train and passed to a time difference detector circuit which compares the time of occurrence of the scanner synchronizing pulse with that of a synchronizing pulse generated by the gating pulse generator once each cycle. The time difference detector circuit comprises in one specific embodiment a lockout type circuit which will operate on the reception of the first synchronizing pulse but will be unaffected by the reception of the second synchronizing pulse. A phase adjustor is connected to this lockout circuit. If the scanner synchronizing pulse lags the gating synchronizing pulse, the phase adjustor is caused to retard the phase of the gating pulse generator. Premature occurrence of the scanner synchronizing pulse on the other hand causes the phase adjustor to advance the phase of the gating pulse generator. Thus the distributing or gating means is kept in step with the scanner and proper distribution of the time divided information to the individual indicating means takes place.

In one specific illustrative embodiment of this invention, the lockout circuit comprises essentially two transistor negative resistance flip-flop circuits with a common load resistance. The scanner synchronizing pulse is applied to the base of one transistor and the gating synchronizing pulse is applied to the base of the other transistor. A pulse applied to the base of either transistor causes it to jump from the low current stable state to the high current stable state while reducing the voltage on the emitter of the other transistor so as to prevent its operation by a second synchronizing pulse. The individual circuits operate in about a microsecond and, therefore, the lockout circuit is very sensitive to differences in the time of arrival of the synchronizing pulses, which factor determines which transistor operates. Should they be pulsed simultaneously, an event that would rarely occur, only one would remain conducting due to the inherent instability of negative resistances in parallel.

After operation of one of the transistors of the lockout circuit, a reset negative pulse is applied to the common emitter lead to cause the return of the operated flip-flop to its original low current condition. In accordance with this specific embodiment of this invention a pulse is received from the lockout circuit and applied to the phase adjustor only when the scanner synchronizing pulse leads the gating synchronizing pulse. If the reset pulse occurs a few milliseconds before the arrival of the next pair of synchronizing pulses, the resultant output from the lockout circuit is a long negative pulse whenever the scanner synchronizing pulse leads the gating synchronizing pulse. While the lag or lead of the phase of the synchronizing pulses is discussed both here and below, it is understood that it is the lag and lead of the time slots defined by the two pulse generators that are to be negated so that the time slots are kept in exact synchronisms.

In one specific illustrative embodiment of this invention, the phase adjustor circuit comprises a charging circuit which causes the potential across a storage capacitor to rise at a nearly constant rate when an output pulse from the lockout circuit is applied to the charging circuit. Removal of the lockout circuit output pulse allows the capacitor to discharge at a similar rate. The capacitor potential controls the flow of current through a direct current amplifier which is connected to a saturable reactor. The inductance of the reactor is thus varied and as the reactor is included in the circuit determining the phase of the gating pulse generator, the phase of the time slots defined by the gating pulse generator is similarly varied.

When the scanner synchronizing pulse leads the gating synchronizing pulse the current from the amplifier is increased with a concomitant reduction of the inductance of the reactor and an advancement in the phase of the gating generator until its synchronizing pulse leads. When this occurs there is no output from the lockout circuit to the charging circuit, the current in the saturable reactor decreases with an increase in its inductance, and the gating pulse generator is retarded in phase. In this manner the corrections to be made in any one cycle are kept to an insignificant time difference so that the time slots of the scanner and gating generators may be considered as substantially coincident and proper gating occurs.

It is one feature of this invention that means be provided for the generation of a pulse in the time slot assigned to a particular line in a pulse train when the line is idle but that generation of the pulse be prevented when the line is being utilized. More specifically, it is a feature of this invention that a voltage source be applied to one wire of each line and a scanning resistor be connected between ground and the other wire of each line, the wires being isolated with respect to direct current at one point and electrically connected together at another point by some associated apparatus so that current flows in the circuit thus defined and through the scanning resistor when the associated apparatus is connected to or is utilizing the line but no current flows when the associated apparatus is not connected or is not utilizing the line. In accordance with this feature of this invention, scanner means are provided for generating a pulse and applying that pulse across the scanning resistor when no current flows in the resistor, whereby an output pulse is transmitted from the scanner means, but means are also provided for preventing the generation of the scanning pulse when current flows in the scanning resistor.

It is a further feature of this invention that means be provided for distributing the pulses of the transmitted pulse train to individual indicating means assigned each line and more specifically that such means comprise means for generating gating pulses to AND circuits which allow passage of an information pulse from the scanner means only on the coincidence in a particular line's time slot of the information pulse and a gating pulse.

It is a further feature of this invention that the scanner pulse generator and the gating pulse generator be maintained in exact synchronism whereby the time slots defined thereby are similarly in exact synchronism. More specifically, it is a feature of this invention that synchronizing pulses be applied to a lockout circuit from both pulse generators, the lockout circuit operating on reception of the first pulse and being unaffected by the reception of the second pulse. In accordance with this feature of the invention, an output is received from the lockout circuit only when one of the synchronizing pulses leads. This output causes a variation in the phase of the gating pulse generator to reverse the phase relationship of the two synchronizing pulses, whereby the synchronizing pulses substantially alternate leading and lagging each other and substantial coincidence of the time slots defined by the two pulse generators is attained.

A complete understanding of this invention and of the various features thereof may be gained from consideration of the following detailed description and the accompanying drawing, the single figure of which is a schematic representation of one illustrative embodiment of this invention.

Turning now to the drawing, a plurality of lines 9 are each connected to associated apparatus 10, which may advantageously be a telephone subset, each line 9 comprising a wire 11 and a wire 12. In this specific embodiment of this invention, each line 9 in the remote office may be connected to a trunk 13, which may extend to a central office by a remote switching network 14, though there need not be any direct connection between the remote lines 9 and the central office in accordance with this invention. Specifically in this embodiment of the invention, the lines 9 are connected to the switching network 14 by transformers 16 and 17, the primaries of which are connected in series across the lines 9 with a capacitance 19 interposed between them, as described further below.

One side of each capacitance 19 is connected to a common positive terminal 21 of a voltage source while the other side is connected through a unidirectional current element 22, such as a diode or a varistor, both to ground through a scanning resistor 23 and through a second unidirectional current element 24 to one coil 27 of a scanning pulse generator 28. Each of the coils of the scanning generator 28, except the synchronizing pulse coil 29, is connected to a common terminal 31 which is itself connected through a resistor 32 to a scanner output lead 33 extending from a grounded common output resistor 35.

The scanning pulse generator 28 may be of any of several known types capable of generating a pulse in each coil 27 and in coil 29 in a time sequence. This may readily be attained by employing saturable magnetic cores mounted in a circular array. These cores are then driven from saturation in one direction to saturation in the other direction at a given driving rate, which may expeditiously be at a 60-cycle per second rate. The driving magnetization force is advantageously large so that the time during which the change in flux between the two extremes occurs is short. Since a voltage is induced in the coils 27 only during this change, a pulse of the proper duration is produced. A complete cycle of output voltages from each coil 27 consists of both positive and negative pulses corresponding to flux reversals of both senses but the varistor 24 allows only utilization of the positive pulse generated in each coil. One specific pulse generator 28 that may advantageously be employed in the combination of this invention employs laminated permalloy coils on which the windings 27 are mounted in a polyphase field produced by two field coils 37 connected through a phase splitting network 38 to an alternating current source 39, which may advantageously be positioned in the central office. The rotation of the magnetic field impresses a sinusoidal force across the magnetic cores, the phase of this force on a particular core being dependent on the angular position of that core. The time occurrence of a pulse generated by a winding 27 is thus facilely determined by the mechanically adjustable angular position of the associated core in the rotating magnetic field. However, other pulse generators may be employed, one such other generator utilizing a number of closed saturable magnetic core transformers having two primary windings of a different number of turns connected to two voltage sources ninety degrees apart and a single secondary winding corresponding to a coil 27. The phase shift between the various coils 27 is obtained by varying the relationship between the number of turns of the two primary windings of the different transformers, as is known in the art.

One end of the synchronizing pulse coil 29 is also advantageously connected to the output lead 33 through a resistance 40 and a unidirectional current element 41 and the other end is connected to ground, the connections of the coil 29 being the reverse of that for the coils 27 so that a pulse of opposite polarity is applied by the coil 29 to the lead 33 to those applied by the coils 27, as described further below.

A direct current scanning circuit is thus defined including each line 9 and associated apparatus 10, the circuit comprising the common voltage source having terminal 21, the primary of the transformer 16, the lead 11, the associated apparatus 10, the lead 12, the primary of transformer 17, the varistor 22 and the grounded scanning resistor 23 for each line 9. As is apparent, the capacitor 19 is a blocking capacitor to isolate the two sections of this direct current circuit while completing the series alternating current path. Advantageously if the associated apparatus 10 is a telephone instrument the self-inductance of the transformers 16 and 17 and the bypass capacitance of the capacitor 19 are chosen to minimize voice frequency attenuation as much as possible without excessive distortion of the dial pulses. The secondaries of the transformers 16 and 17 connected to the switching network 14 complete the necessary direct current paths in the switching network. If no switching network is employed, the direct current scanning circuit may be provided for in other ways. Thus blocking capacitors may be directly positioned in each of the leads 11 and 12 to define the scanning circuit while allowing passage of alternating signal currents.

When the condition of the line 9 is such that no current flows therein, which would be the case when the associated apparatus is disconnected from the line or, in the case of a telephone instrument, when the instrument is in the on-hook condition, no current, other than that due to whatever leakage conditions may be present, will flow through the scanning circuit and thus the voltage across the scanning resistors 23 is substantially zero. In this condition a positive pulse supplied by a coil 27 of the scanning generator 28 causes current to flow in the loop made up of the pulse coil 27, the rectifying varistor 24, the scanning resistor 23, resistor 32, and the common output resistor 35, resulting in a generation of a negative voltage across the common output resistor 35 and thus a negative information pulse on the output line 33 in the time slot of that particular line 9 indicating that that line is in an idle condition. When a negative pulse is generated by a scanning coil 27 during the rotation of the magnetic field of the generator no current flows in the scanning loop just defined due to the presence of the unidirectional or rectifying element 24.

However, when a signal is present on any of the lines 9, as when an associated apparatus is connected to a line 9 or, in the case of a telephone instrument, when the instrument is in an off-hook condition, current will flow in the scanning circuit from the voltage source 21 through the leads 11 and 12 and through the scanning resistor 23 to ground, producing a finite voltage across the scanning resistor 23. This voltage is sufficiently large, even for the worst circuit conditions, to back bias the rectifying element or varistor 24 and thus prevent the flow of current in the common output resistor 35 in the time slot of this particular line when a positive voltage pulse is generated by the coil 27 associated with that line. The result is thus a zero voltage across the common resistor 35 and no pulse on the common output lead 33 during the time slot of this particular line, indicating that the line is in some manner being employed.

Once every rotation of the magnetic field of the scanning generator 28 a pulse is generated by the synchronizing coil 29 causing current to flow in the loop comprising the coil 29, the varistor 41, resistor 40 and common output resistor 35. The coil 29 is so connected to the common output resistor 35 and the varistor 41 is so arranged that the current flowing in the common output resistor 35 causes a voltage to occur across the resistor 35 of opposite polarity to that caused by current flowing through the coils 27 and thus a pulse of opposite polarity is applied to the common output lead 33.

Information is thus sent to the central office describing whether the apparatus 10 associated with any and each line 9 is being used or not, the information comprising the presence or absence of a negative information pulse in the time slot of that particular line in the scanning sequence and a synchronizing positive pulse. In the central office the line information is gated to indicating circuits 45, one such circuit being present for each line 9, and means are provided for assuring that the gating operation proceeds in synchronism with the time slots defined by the scanning pulse generator 28 in the remote office. In the specific embodiment of this invention illustrated in the drawing, the gating is achieved by a gating pulse generator 47 which may be identical to the scanning pulse generator 28 and which comprises a gating pulse coil 48 for each of the lines 9 being scanned, a synchronizing pulse coil 49 and a reset pulse coil 50, the functions of the latter two coils being explained below. Each indicating circuit 45 is connected to the common output lead 33 from the remote office by a lead 52 and a unidirectional circuit element such as a varistor 53. In turn each gating pulse coil 48 is connected to the lead 52 from an indicating circuit 45 by a unidirectional circuit element, such as a varistor 54. A negative potential is applied to the lead 52, and thus to one side of each of the varistors 53 and 54, by a voltage source 56 through a resistance 57. The two unidirectional circuit elements 53 and 54 together with the negative potential supply 56 and the resistors thus comprise a negative AND circuit and allow passage of the negative information pulse from the common output lead 33 from the remote station to the indicating circuit 45 connected thereto only on the concurrent presence of a negative pulse both at varistor 53 from the lead 33 and at varistor 54 from the gating pulse coil 48.

It is to be noted that the gating pulse generator 47 is operated so that negative pulses are supplied by the gating pulse coils 48 for operation of the AND circuits whereas the scanning pulse generator 28 in the remote office is operated so that positive pulses are supplied to the scanning resistors 23. The driving polyphase magnetic field of the gating pulse generator 47 may advantageously be supplied by two field coils 60 connected through a phase splitting network 61 and one winding 62 of a saturable reactor 63 to the alternating current source 39 which advantageously similarly supplies power to the phase splitting network 38 for the scanning pulse generator 28 in the remote office.

Each indicating circuit 45 advantageously comprises a single shot multivibrator circuit 65 and an indicating device, such as a neon lamp 66. The multivibrator circuit may comprise a pair of tubes 67 and 68, which may, as shown in the drawing, be two sections of a twin triode tube having a common cathode ground connection and cathode resistor 69. Tube section 68 is normally conducting but application of a negative pulse from the lead 52 to its grid, on the coincident appearance of a negative pulse at varistor 53 in that line's time slot and a negative pulse from the gating pulse coil 48 at varistor 54, causes extinction of the tube section 68 and the firing of tube section 67, as is known in the art, thereby causing an increase of potential across the lamp 66 causing it to break down. The time constant of the circuit 45, as determined mainly by the coupling condenser 71 and the resistor 72, need only be such that the normal condition of the circuit, i. e., extinction of tube section 67 and firing of tube section 68, is attained before the occurrence of the particular line's time slot in the next scanning cycle. As a negative pulse is transmitted from the scanning generator 28 on the common output lead 33 in a particular time slot only when the apparatus 10 associated with the line of that time slot is idle, the lighting of the lamp 66 is an indication that the line assigned to that time slot is idle.

As it is important that the information pulses from the scanning pulse generator 28 and the gating pulses from the gating pulse generator 47 be in synchronism for proper operation of the add circuits associated with each time slot, i. e., with each line, means are provided in accordance with this invention for assuring such swnchronism. The synchronizing pulse from the synchronizing pulse coil 29 of the scanning pulse generator 28 is a positive pulse, in this specific illustrative embodiment of this invention, and is transmitted from the remote office to the central office by the common output lead 33, as described above. In the central office this positive synchronizing pulse is shunted from the common output lead 33 before the multipled add varistors 53 by a unidirectional circuit element 75 connected to ground through one winding 76 of a transformer 77. This transformer 77 serves to reverse the polarity of the synchronizing pulse so that a negative pulse is applied from the other winding 78 of the transformer 77 to the base of one transistor 79 of a lockout circuit 80, as described further below. A negative synchronizing pulse from the synchronizing coil 49 of the gate pulse generator 47 is applied to the base of the second transistor 81 of the lockout circuit 80, through a unidirectional circuit element such as a varistor 82.

When no synchronizing signals are applied to the transistors 79 and 81 there is no emitter current, the emitter voltage of each transistor is the same and the base of each transistor is held slightly positive, though it may be considered as approximately ground potential, by a common positive voltage source 84 and identical base resistances 85 connected through unidirectional current elements, such as varistors 86, and identical signal input resistors 87 to ground. The emitter characteristic of each transistor is also controlled so that the emitter voltage will never go more negative than a predetermined value by a negative potential source 90 connected to the base of each transistor through unidirectional circuit elements such as varistors 91. In this manner the two transistors 79 and 81 of the lockout circuit 80 are assured to have emitter characteristics with identical no signal input and maximum signal input points. As the peak and valley points of the negative resistance characteristics of the two transistors are thus stabilized at the same values, the characteristics of the two transistors are sufficiently alike for satisfactory operation of the lockout circuit despite physical differences that may occur in the manufacture of the transistors.

The operation of the lockout circuit 80, which is of the type described in greater detail in an application Serial No. 289,270, filed May 22, 1952 of B. G. Bjornson, is such that either transistor 79 or 81 may be conducting at any given time but not both. As shown in the circuit a negative bias is applied to the collectors of the two transistors by a negative voltage source 94 and a slight negative voltage bias is applied to the emitters of both transistors by a common voltage source 95. If a negative synchronizing pulse arrives at the lockout circuit from the scanning pulse generator 28 in the remote station, through the common output lead 33 and the polarity reversing transformer 77, before a negative synchronizing pulse arrives at the lockout circuit from the synchronizing coil 49 of the gate pulse generator 47, the transistor 79 will be fired while the transistor 81 will remain extinguished. Similarly if the gate synchronizing pulse leads the scanning synchronizing pulse the transistor 81 will be fired and the transistor 79 will remain extinguished. While a particular transistor lockout circuit has been described it is to be understood that other lockout circuits could advantageously be employed in combinations of this invention.

The operation of the lockout circuit 80 and the associated means for maintaining the scanning pulse generator and the gating pulse generator in synchronism can be most easily understood from consideration of the operation of the specific illustrative circuit embodiment of this invention depicted in the drawing for the situation when the scanning synchronizing pulse leads the gating synchronizing pulse. In such a case the transistor 79 will conduct first and the sequent arrival of the gating synchronizing pulse will be ineffectual. Conduction of the transistor 79 causes the device to be removed from its prior low conduction state to a high conduction state, the exact change depending on the load resistances 97 and 98 connected between the emitter of the transistor and the common low negative potential source 95. This in turn will cause a negative pulse to be applied to the grid 100 of a triode 101 in the charging circuit 102. Triode 101 is normally conducting so that current flows from the plate potential source 104 through resistors 105 and 106, resistor 106 advantageously being approximately one-half the resistance of resistor 105. When triode 101 is normally conducting the storage capacitor 109 connected between the grid 110 of an amplifier tube 111 of the amplifier circuit 112 and ground is at or attaining the voltage of the point of connection between the resistor 105 and the resistor 106. As resistor 105 is larger than resistor 106 and as they are connected between the positive voltage source 104 and a negative voltage source 113 connected to the cathode of the triode 101, this will be a negative voltage. However, the voltage divider thus formed by resistors 105 and 106 is opened when conduction through triode 101 is stopped on application to the grid 100 of the triode of a negative pulse from transistor 79 due to the scanning synchronizing pulse leading the gating synchronizing pulse. The storage capacitor 109 is then directly connected to the positive voltage source 104 through the resistor 105, and it will therefore charge positive towards the potential of the source 104. The grid 110 of the amplifier 111 is thus swung positively with an increase in the current output from the anode 114 of the amplifier tube 111. The tube 111 will normally be conducting as the capacitor will not generally charge to a high enough negative potential during the period of conduction of the triode 101 to extinguish the tube 111. The anode 114 is connected by a lead 115 to the other winding 116 of the saturable reactor 63. An increase in current in this winding 116 reduces the inductance of the saturable reactor and thus of the first winding 62 thereof causing the rotating field of the gate pulse generator derived from the phase splitting network 61 to advance in phase, thereby advancing all the gating pulses and the gating synchronizing pulse similarly in phase.

Let us now consider what happens when the inductance of the saturable reactor has been sufficiently reduced that the gate synchronizing pulse leads the scanning synchronizing pulse. As the magnetic field of the gating pulse generator 47 rotates it generates a negative pulse in the reset coil 50 before generating another synchronizing pulse in the synchronizing coil 49. This reset pulse is applied to the emitters of both transistors 79 and 81 through a unidirectional circuit element 116 which prevents passage of positive pulses, and the load resistance 97 returns the transistors to their stable low current conditions in preparation for the application of a synchronizing pulse. Now, however, as the gating pulse generator is leading the scanning generator in phase the gating synchronizing pulse arrives first at the lockout circuit 80 and is applied, through varistors 82 and 86, to the base of transistor 81. Conduction in this transistor then prevents conduction in transistor 79 on application thereto of the scanner synchronizing pulse and thus no negative output is delivered from the base of transistor 79 to the grid 100 of triode 101 of the charging circuit. Conduction through this triode is thus normal causing the storage capacitor 109 to discharge, thereby lowering the potential of the grid 110 of the amplifier tube 111 and reducing the plate current flowing to the winding 116 of the saturable reactor 63, thus increasing the inductance of the winding 62 with a concomitant retardation of phase of the rotating field of the gating pulse generator 47. In this way the time slots assigned each line in the central office, as defined by the gating pulses generated by the coils 48, will alternately lead and lag the time slots assigned each line in the remote office, as defined by the scanning pulses transmitted to the central office, but the time deviation from perfect synchronization of the time slots is generally less than the time correction which occurs in one cycle. As this maximum deviation may advantageously be made small in comparison to the duration of the pulses, they are substantially coincident and proper synchronization of the scanner time slots and gate time slots results.

It is to be understood that the above-described arrangemens are illustrative of the application of the principles of the invention. Numerous other arrangements may be devised by those skilled in the art without departing from the spirit and scope of the invention.

What is claimed is:

1. An electrical system for scanning a plurality of lines each comprising a pair of wires, and for transmitting information indicating the condition of the lines to a central office remote from the wires comprising a source of direct current potential connected to one wire of each of said lines, a scanning resistor connected to the other wire of each of said lines, means isolating said wires with respect to direct current whereby said wires, source of potential, and scanning resistor define a direct current circuit closed when apparatus associated with said line is connected thereacross, means for generating a plurality of scanning pulses and applying said pulses to each of said scanning resistors in succession, an output resistor common to all of said lines, said output resistor, generating means, and scanning resistors defining a scanning circuit for each of said lines whereby a pulse appears across said output resistor on flow of current in any of said scanning circuits, and means for preventing the application of a scanning pulse to a scanning resistor when current is flowing in that resistor due to flow of current in said direct current circuit.

2. An electrical system comprising a plurality of lines each comprising a pair of wires, a central office remote from said lines, and means for transmitting to said central office information as to the condition of said lines, said means comprising a scanning resistor associated with each of said lines, means including said scanning resistor, said wires and a source of direct current potential defining a direct current circuit for each of said lines closed when said line is being utilized and open when said line is idle, a scanning generator for applying a pulse to each of said scanning resistors in time sequence, a common output resistor connected to said scanning generator across which a voltage is developed on flow of current through said generator and said scanning resistors on application of said pulses to said scanning resistors, unidirectional current members connected between said scanning generator and each of said scanning resistors and preventing flow of current through said scanning resistors due to said scanning generator pulses when said direct current circuits are closed, whereby no voltage pulse is developed across said common output resistor, and a common output lead for transmitting to said central office information in the form of a train of pulses or no pulses in time sequence indicating the condition of each of said lines.

3. In an electrical system, a plurality of lines, a central office remote from said lines, means for scanning each of said lines in succession and transmitting to said central office a train of pulses, each of said pulses being in a time slot assigned to a particular one of said lines and indicating the condition of said lines, said means comprising a scanning pulse generator having a generating coil for each of said lines and means for generating a rotating magnetic field to sweep each of said coils in succession, a plurality of indicating means in said central office, one of said indicating means being assigned to each of said time slots, gating means in said central office for distributing said pulses to said indicating means assigned to the same time slot, said gating means comprising a gating pulse generator having a generating coil for each of said indicating means and means for generating a rotating magnetic field to sweep each of said coils in succession, and means for maintaining the phase of said scanning and gating generator rotating fields in synchronism.

4. In an electrical system in accordance with claim 3 said means maintaining said fields in synchronism comprising a synchronizing coil in each of said generators for generating synchronizing pulses, means for comparing the time difference in the phase of said scanning and gating synchronizing pulses, and means for varying the phase of the rotating field of one of said generators in response to the output of said comparing means.

5. In an electrical system, a plurality of lines each comprising a pair of wires, a central office remote from said lines, means for scanning each of said lines in succession and transmitting to said central office a train of pulses indicating the condition of said lines, said scanning means comprising a scanning resistor associated with each of said lines, means defining with said pair of wires and said scanning resistor of each of said lines a direct current circuit closed when said line is being utilized and open when said line is idle, a scanning generator for applying a scanning pulse to each scanning resistor when the line associated therewith is idle, means for preventing the application of a scanning pulse to said scanning resistor when said line is busy, said last-mentioned means comprising a unidirectional circuit element, and means for transmitting an information pulse to said central office on flow of current through said scanning resistor due to application thereto of a scanning pulse, a plurality of indicating means in said central office, one of said indicating means being assigned to each of said lines, gating means in said central office for distributing said information pulses to said indicating means assigned to the lines of which said pulses are informative, said gating means comprising a gating pulse generator, means applying said gating pulses to each of said indicating means in succession, and means allowing passage of an information pulse to one of said indicating means only on the coincidence of an information pulse and a gating pulse, said last-mentioned means comprising a pair of unidirectional circuit elements, and means maintaining said scanning generator and said gating generator in synchronism, said maintaining means comprising, means for generating a scanner synchronizing pulse, means for generating a gating synchronizing pulse, means for comparing the time delay between said synchronizing pulses, and means for retarding or advancing the phase of one of said pulse generators in response to the output of said comparing means.

6. In an electrical system a plurality of lines, a central office remote from said lines, means for scanning each of said lines in succession and transmitting to said central office a train of information pulses, each of said pulses being in a time slot assigned to a particular one of said lines and indicating the condition of said lines, said scanning means comprising a scannng pulse generator, a plurality of indicating means in said central office, one of said indicating means being assigned to each of said time slots, gating means in said central office for distributing said information pulses to said indicating means assigned to the same time slot, said gating means comprising a gating pulse generator and means allowing passage of one of said information pulses to said indicating means only on the coincidence of an information pulse and a gating pulse at said indicating means, and means for maintaining said scanning pulse generator and said gating pulse generator in synchronism.

7. In an electrical system in accordance with claim 6, said means for maintaining said scanning pulse generator and said gating pulse generator in synchronism comprising means for generating a scanning synchronizing pulse, means for generating a gating synchronizing pulse, means for comparing the time of occurrence of said synchronizing pulses, said comparing means comprising a lockout circuit to which each of said synchronizing pulses is applied but which is responsive to only the first of said synchronizing pulses applied thereto, and means for varying the phase of said gating pulses in response to the output of said lockout circuit when one of said synchronizing pulses is first applied thereto.

8. In an electrical system in accordance with claim 7, said means for varying the phase of said gating pulses comprising means determining the phase position of said gating pulse, said determining means including an inductor, an amplifier tube connected to said inductor, a storage capacitor connected across the control grid of said tube and controlling the current output therefrom to said inductor, and means charging said storage capacitor when there is an output from said lockout circuit whereby said current to said inductor increases and discharging said capacitor when there is no output from said lockout circuit whereby the current to said inductor decreases.

9. An electrical system comprising a plurality of lines, means for scanning each of said lines in succession and generating a train of information pulses descriptive of the condition of said lines, indicating means remote from said lines, gating means for distributing said pulses to said indicating means, a common power source for said scanning and gating means, and means controlled by said scanning and gating means for varying thte phase of said power supply with respect to said gating means to maintain synchronization between said scanning and said gating means, said last-mentioned means comprising means for generating a scanner synchronizing pulse, means for generating a gating synchronizing pulse, and means for comparing the time occurrences of said two synchronized pulses for advancing or retarding the phase of said power supply with respect to said gating means depending on which of said synchronizing pulses occurs first.

10. An electrical system in accordance with claim 9 wherein said last-mentioned means comprises means for generating a scanner synchronizing pulse, means for generating a gating synchronizing pulse, a lockout circuit comprising a pair of electron conducting elements, means applying one of said synchronizing pulses to one of said elements and the other of said synchronizing pulses to the other of said elements, an inductor connected to said power supply and determining the phase of said gating means, an amplifier tube connected to said inductor, a storage capacitor connected across the control grid of said tube, and means connected to one of said elements of said lockout circuit for charging said storage capacitor when a synchronizing pulse is first applied to said one element whereby said current to said inductor increases and discharging said capacitor when a synchronizing pulse is first applied to the other of said elements of said lockout circuit whereby the current to said inductor decreases.

11. In an electrical system a plurality of lines each comprising a pair of wires, a central office remote from said lines, means for scanning each of said lines in succession and transmitting to said central office a train of information pulses indicating the condition of said lines, said scanning means comprising a scanning resistor associated with each of said lines, means including said scanning resistor, said wires and a source of direct current potential defining a direct current circuit for each of said lines closed when said line is being utilized and open when said line is idle, a scanning pulse generator for applying a pulse to each of said scanning resistors in time sequence, a common output resistor connected to said scanning generator across which a voltage is developed on flow of current through said generator and said scanning resistors on application of said scanning pulses to said scanning resistors, unidirectional current members connected between said scanning generator and each of said scanning resistors and preventing flow of current through a scanning resistor due to a scanning generator pulse when said direct current circuit including said scanning resistor is closed, whereby no information pulse is developed across said common output resistor, and a common output lead for transmitting to said central office said information pulses, a plurality of indicating means in said central office, one of said indicating means being assigned to each of said lines, gating means in said central office for distributing said information pulses to said indicating means assigned to the same line comprising a gating pulse generator and means allowing passage of an information pulse to one of said indicating means only on the coincidence of an information pulse and a gating pulse at said indicating means, said last-mentioned means comprising a pair of unidirectional circuit elements connected to each of said indicating means and, means for maintaining said scanning pulse generator and said gating pulse generator in synchronism, said maintaining means comprising means for generating a scanning synchronizing pulse, means for generating a gating synchronizing pulse, means for comparing the time of occurrence of said synchronizing pulses, said comparing means comprising a lockout circuit to which each of said synchronizing pulses is applied but which is responsive only to the first of said synchronizing pulses applied thereto, means determining the phase position of said gating pulses, said determining means including an inductor, an amplifier tube connected to said inductor, a storage capacitor connected across the control grid of said tube and controlling the current output therefrom to said inductor, and means charging said storage capacitor when there is an output from said lockout circuit whereby said current to said inductor increases and discharging said capacitor when there is no output from said lockout circuit whereby said current to said inductor decreases.

12. An electrical system for scanning a plurality of lines each comprising a pair of wires and for transmitting information indicating the condition of the lines to a central office, comprising a source of direct current potential connected to one wire of each of said lines, a scanning resistor connected to the other wire of each of said lines, means isolating said wires with respect to direct current whereby said wires, source of potential and scanning resistor define a direct current circuit closed when apparatus associated with said line is connected thereacross, means for generating a plurality of scanning pulses and applying said pulses to each of said scanning resistors in time sequence, an output resistor common to all of said lines, said output resistor, generating means and scanning resistors defining a scanning circuit for each of said lines whereby a pulse appears across said output resistor depending on the flow of current through said scanning resistors in any of said scanning circuits, and diode means connecting said generating means and said scanning resistors.

13. An electrical system comprising a plurality of lines each comprising a pair of wires, a central office, and means for transmitting to said central office information as to the condition of said lines, said means comprising a scanning resistor associated with each of said lines, means including said scanning resistor, said wires and a source of direct current potential defining a direct current circuit for each of said lines closed when said line is being utilized and open when said line is idle, a scanning generator for applying a pulse to each of said scanning resistors in time sequence, a common output resistor connected to said scanning generator across which a voltage is developed on flow of current through said generator and scanning resistors on application of said pulses to said scanning resistors, a diode individually connected between said scanning generator and each of said scanning resistors, and a common output lead for transmitting to said central office information in the form of a train of pulses in time sequence indicating the condition of each of said lines.

14. An electrical system for scanning a plurality of lines each comprising a pair of wires and for transmitting information indicating the condition of the lines to a central office, comprising a source of direct current potential connected to one wire of each of said lines, a scanning resistor connected to the other wire of each of said lines, means isolating said wires with respect to direct current whereby said wires, source of potential, and scanning resistor define a direct current circuit closed when apparatus associated with said line is connected thereacross, means for generating a plurality of scanning pulses and applying said pulses to each of said scanning resistors in succession, an output resistor common to all of said lines, said output resistor, generating means and scanning resistors defining a scanning circuit for each of said lines whereby a pulse appears across said output resistor dependent on the flow of current through said scanning resistors, a diode individually connecting each of said scanning resistors and said generating means, and a common output lead for transmitting to said central office information in the form of a train of pulses in time sequence indicating the condition of each of said lines.

References Cited in the file of this patent

UNITED STATES PATENTS 2,541,932 Melhose ---------------- Feb. 13, 1951